Feb. 6, 1945. G. A. F. WINCKLER 2,368,697
NONDETERIORATING DRY BATTERY
Filed Jan. 8, 1941 2 Sheets—Sheet 2
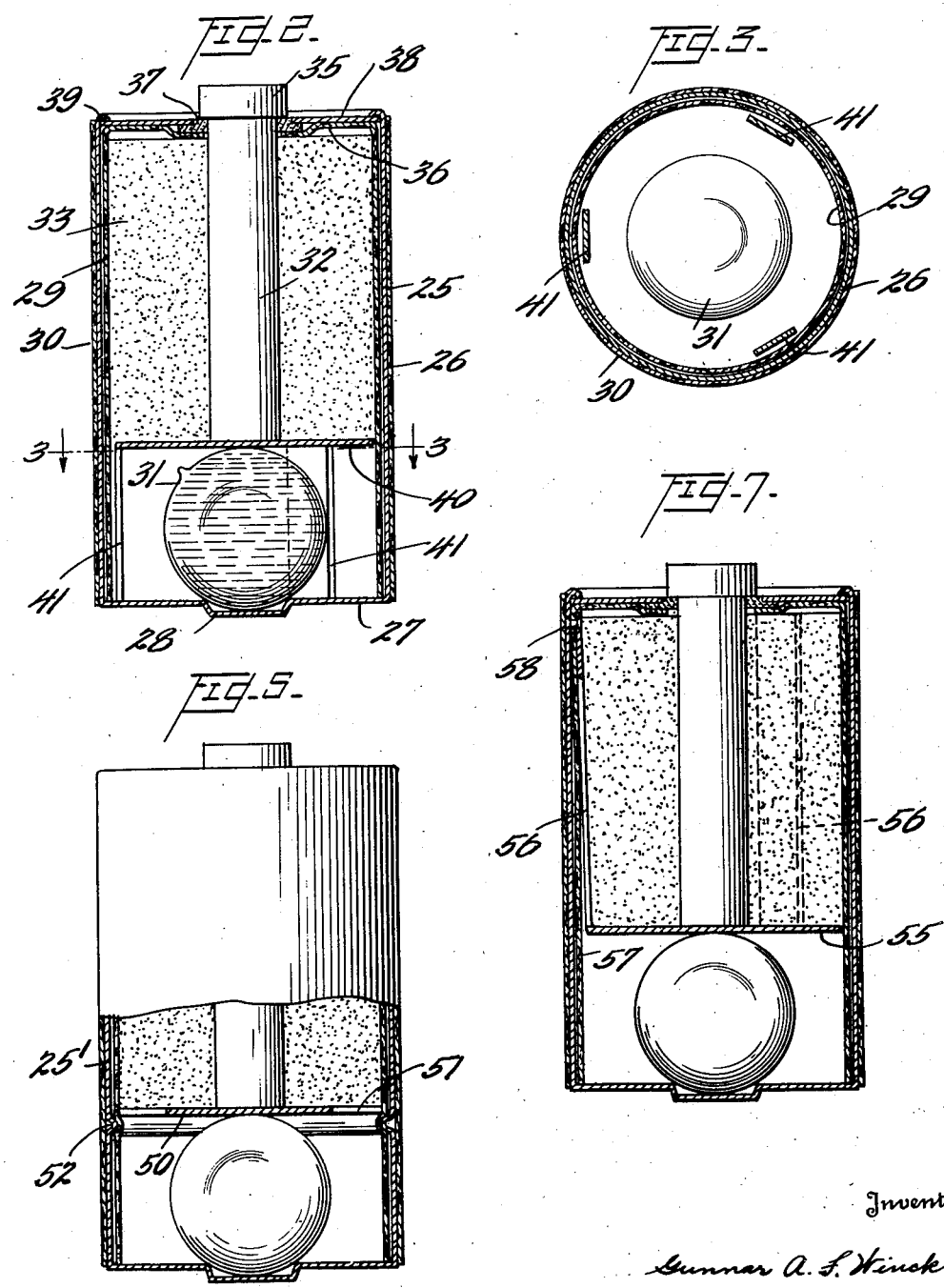
Inventor
Gunnar A. F. Winckler
By Watson, Cole, Grindle & Watson
Attorney Patented Feb. 6, 1945

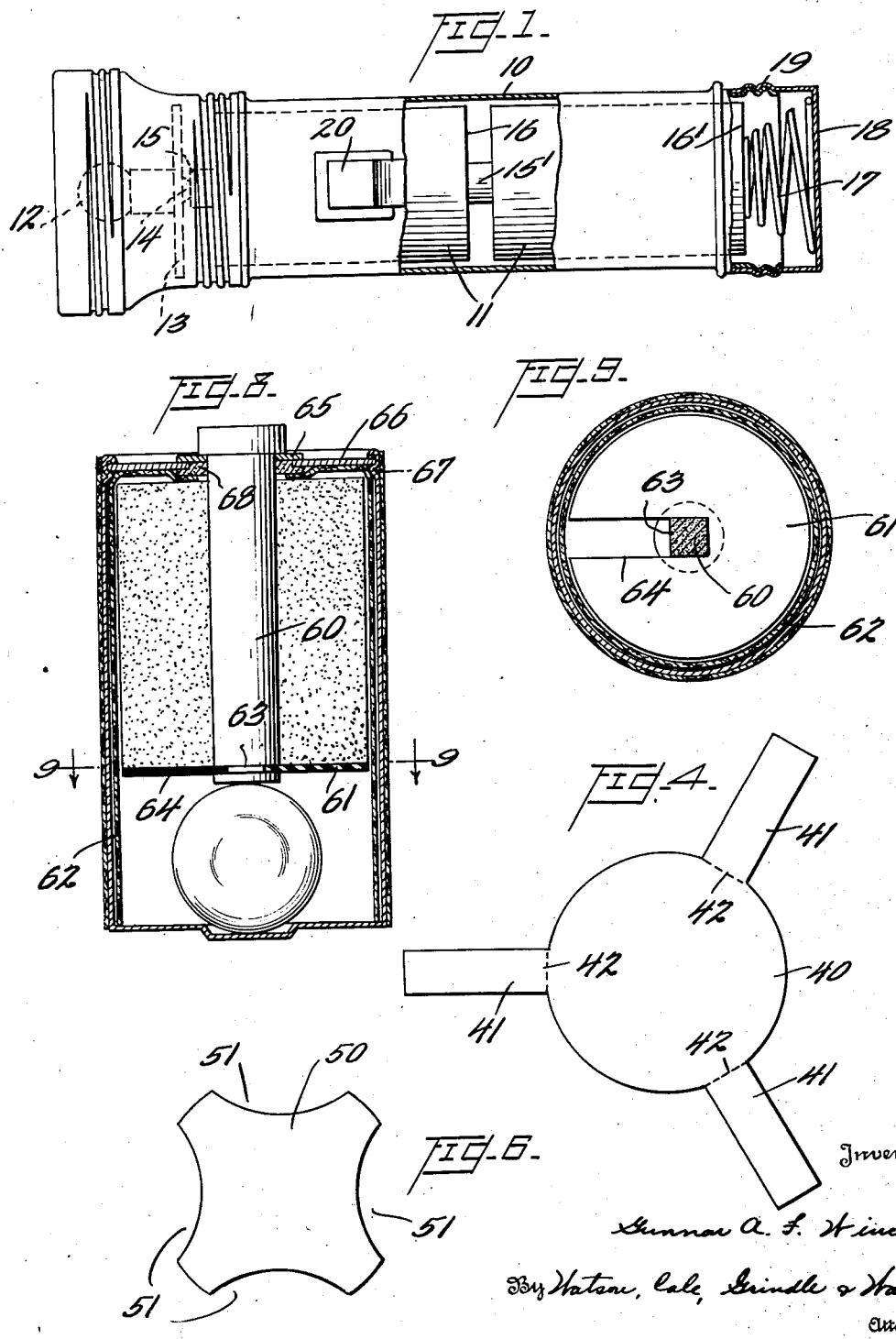

2,368,697

UNITED STATES PATENT OFFICE 2,368,697

NONDETERIORATING DRY BATTERY

Gunnar A. F. Winckler, Elkton, Md., assignor to Winckler Engineering Laboratories, Inc., Boston, Mass., a corporation of Massachusetts Application January 8, 1941, Serial No. 373,672

11 Claims. (Cl. 136—113)

This invention relates to batteries and particularly to primary batteries of the so-called dry cell type and incorporates improvements in such batteries which gives them non-deteriorating characteristics throughout their shelf life and retains their full potential energy available until they are actually put into use.

It is a general object of the present invention to provide a novel and improved dry battery.

More particularly it is an object of the invention to provide improvements in dry batteries of the non-deteriorating or deferred action type enabling them to be put into wider and more general use in spite of the type of service demanded.

An important object of the present invention consists in the provision of a non-deteriorating type of dry battery in which novel means are arranged for retaining the various elements and ingredients thereof always in the same relative positions prior to and after placing the battery into the active state whereby its size remains constant and the seal is kept intact as originally formed.

Another important feature of the invention consists in the arrangement of a combined bobbin supporting means and electrolyte vial anvil.

A further important object of the invention consists in the provision of means for supporting the bobbin and its associated carbon electrode from a permanent and non-deteriorating portion of the cup electrode.

An important feature of the invention resides in the use of a sealing element for the top of the electrode cup which forms an active portion of the same to extend the active area into close engagement with the chemical ingredients of the battery.

A further important feature of the invention resides in the use, in a battery of the stored electrolyte type, of means for preventing collapse of the bobbin or inward movement of the carbon electrode when subjected to longitudinal pressure exerted for the purpose of providing good electrical contact between superimposed batteries and stationary contacts.

Other and further features and objects of the invention will be more apparent to those skilled in the art upon a consideration of the accompanying drawings and following specification wherein are disclosed several exemplary embodiments of the invention with the understanding that such changes and modifications may be made therein as fall within the scope of the appended claims without departing from the spirit of the invention.

It has heretofore been proposed to provide dry cells of the so-called Leclanche type in which all of the electrolyte in the form of a liquid or a paste was maintained separate from the other elements of the battery until time to place the same into operation when the electrolyte was released and saturated the more or less porous chemical materials arranged between the zinc cup and the carbon rod.

Such batteries, however, have never been manufactured for flash-light or similar use and were always provided with binding post or pigtail terminals for making connection between individual cells or to the external circuit unless these cells were of a type in which the external dimensions were changed upon putting them into operation. It has been found that cells of the latter type, however, are not popular since the necessary amount of manipulation required to place them in operation makes the instructions for use too complicated for certain consumers, and furthermore the seal for the whole cell cannot be made satisfactory due to the need for relative movement of parts at the time that the cell is conditioned for operation.

Where non-deteriorating batteries have been made which require no substantial change in the exterior dimensions to put them into use, the electrolyte has usually been arranged in a vial which could be broken by a slight deformation of the zinc cup. For general convenience in manufacture and operation, this vial is centrally disposed at the bottom of the cup and the central carbon must be shortened to accommodate it. Upon breaking the vial the carbon and its surrounding depolarizing material is left more or less unsupported, from the bottom of the cup, which is no serious detriment in batteries having terminals of the type referred to, but where such batteries are intended for flash-light use or for any use where they are connected in series by superpositioning and are then connected to the external circuit by spring contacts engaging the top of the central electrode and the bottom of the cup electrode, so much pressure is required to maintain good electrical contact that there was a tendency to collapse the battery by pressing the carbon electrode into the cup to occupy the space vacated upon breaking of the vial.

The present invention proposes novel improvements for preventing these difficulties and for further enhancing the advantages and removing the disadvantages of the so-called non-deteriorating type of dry cells making them not only feasible but highly desirable for portable use, by eliminating entirely any loss of life or potential energy prior to use and giving them actually a longer life and greater total useful energy than in the more conventional type of battery.

In the drawings referred to above:

Figure 1 is a side elevation with parts broken away of a flash-light equipped with batteries constructed according to the present invention;

Figure 2 is a vertical central section through a preferred form of battery constructed in accordance with the present invention;

Figure 3 is a transverse section on line 3—3 of Figure 2;

Figure 4 is a developed view of the bobbin support and vial anvil;

Figure 5 is a view similar to Figure 2 of a modified form of structure;

Figure 6 is a view of the bobbin support used with the construction of Figure 5;

Figure 7 is a view similar to Figure 2 of a further embodiment showing the bobbin support carried from the upper portion of the zinc cup;

Figure 8 is a view similar to Figure 2 of a fourth embodiment depicting another method of supporting the bobbin from the top of the zinc cup; and Figure 9 is a section on line 9—9 of Figure 8.

Referring now to the drawings and first to Figure 1, there is shown a conventional pocket flash-light of the tubular type adapted to receive two unit dry cells of a standard size. Such a flash-light includes the housing tube 10 of sufficient length to receive the two dry cells 11 therein. At one end of the tube a lamp 12 is supported in a disc 13 and its central contact 14 projects below the disc for engagement directly with the central electrode 15 of the upper battery 11. The central electrode 15' of the lower battery 11 is adapted to abut against the bare zinc base 16 of the upper battery to form electrical contact therewith and the bare zinc base 16' of the lower battery is adapted to be contacted by the upper coil of a conical spring 17 secured to the base cap 18 of the flash-light, which cap is removable for inserting or renewing batteries. The cap is threaded on to the tube 10 as shown at 19 and as it is tightened the spring is urged against the base of the lower battery effecting contact therewith and pressing the contact electrodes of the two batteries together and the central electrode of the upper battery against the base of the lamp. The circuit is completed from the spring to the outer terminal of the lamp by a metal strap, not shown, and a suitable switch 20 in the well-known manner.

It will be seen that in order for good electrical contact to be effected in the above assembly, considerable longitudinal pressure must be exerted tending to press the central electrode inwardly into the zinc cup of the battery, and some means must be provided to resist this thrust and prevent the collapse of the battery. In the conventional deteriorating type of dry cell the central electrode reaches substantially to the bottom of the zinc cup and is spaced therefrom only by an insulating porous paper disc so that there is no tendency for the contact thrust to collapse the battery. In accordance with the present invention, however, the lower portion of the zinc cup houses a frangible vial, later to be described, which is broken when the battery is put into operation to release the electrolyte. Means must therefore be provided to support the central electrode and the active material surrounding the same to prevent them from being pressed into the cup by the contact pressure and the several means for this purpose form the most important feature of this invention.

Referring now to the preferred embodiment shown in Figures 2, 3, and 4, it will be seen that the battery is of more or less conventional appearance externally and in general in construction, in that the outer container 25 is preferably an integral zinc cup including the side walls 26 and the bottom 27. The central portion of the bottom is, however, deformed outwardly as at 28 to provide an external protuberance and inner depression, the purpose of which will eventually appear. This cup is of substantially the same length as one in a more or less conventional type of battery and is lined for the full length of the side walls only by a layer 29 of bibulous material such as blotting paper or the like which is of such a length that it extends for a distance beyond the end of the cup prior to the completion of the assembly operation. A suitable insulating and protective layer 30 of cardboard, paper or the like covers the outside of the side walls only of the zinc cup in the usual manner and may be printed with the manufacturer's name, directions for use, and the like.

Resting directly on the bottom wall of the zinc cup and centrally positioned by virtue of the depression 28 is a frangible vial 31 made of glass or the like and completely filled with a liquid electrolyte sealed therein in any desired manner. The walls of the vial are extremely thin and the electrolyte is of a water-like consistency, being preferably a concentrated solution of ammonium chloride, more commonly termed sal ammoniac, or of some similar electrolyte which, upon the vial being broken, will be rapidly absorbed by the bibulous layer 29 and carried upwardly to moisten the other active materials of the battery which are originally assembled dry.

The central electrode 32 comprising a carbon rod, and the polarizing material 33 are formed into a bobbin by pressing the depolarizing material in a dry state around the carbon rod. This rod which in normal assembly projects above the top edge of the zinc cup is preferably fitted with a metal cap 35 to reinforce it and provide for better contact engagement with either the terminals of a flash-light or similar device or the bottom of the zinc cup of a superimposed battery. The bobbin in its dry state is made to substantially fill the zinc cup, having reasonably close engagement with the bibulous lining 29 and extending substantially from the top of the electrolyte container to the top of the cup. The bobbin is assembled by dropping it into position in the cup and the extending portion 36 of the bibulous liner is then folded over the top of the depolarizing material as clearly seen in Figure 2, reaching substantially to the projecting carbon. Preferably before being provided with the depolarizing mass the carbon is fitted with a sealing washer 37 which may be of waxed paper or the like formed with two external diameters, the larger being at the lower portion and under which the edges of the lining 36 may be tucked.

As a sealing closure for the top of the cell use is made of a zinc annulus 38 which rests on top of the liner 36 and is centrally perforated to closely engage the smaller diameter of the washer 37 as shown. The edges of the cup, within the side walls of which the annulus is a close fit, are turned over the top of it in a beading operation as shown at 39, and soldered if desired, or in any other way suitably engaged with the walls of the cup to provide electrical conductivity.

To provide a support for the bobbin, both to prevent the central carbon from being pressed down into the space originally occupied by the vial and to prevent slumping of the depolarizing agent when it is softened by the liquid electrolyte, a bobbin support is provided in the form of a disc 40 of zinc, relatively stiff fiber, waxed paper, cardboard or the like, which is provided with a plurality of integral legs 41, as best seen in Figure 4, which are folded along the lines 42 so that they extend at right angles to the plane of the disc. These legs 41 are of a length substantially equal to the vertical height of the electrolyte vial and when the disc is positioned as shown in Figure 2, the lower ends of the legs rest on the bottom of the zinc cup and space the disc 40 a predetermined distance above the same just sufficient to accommodate the vial. Naturally, the disc, which with its legs may be referred to as a spider, is inserted following the insertion of the electrolyte vial and before the assembly of the bobbin into the zinc cup.

The supporting spider serves not only to prevent collapse of the bobbin parts into the space originally occupied by the vial, but it provides a convenient anvil against which the vial is broken when it is desired to place the battery into active service. It will be noted that in the assembly of the battery the only liquid is sealed in the vial, and the liner 29, the central carbon rod, and the depolarizing mass 33 are entirely dry so that the battery is inactive either electrically or chemically and there is no deterioration whatsoever on the shelf. Therefore the battery can be kept for any desired period without losing in the slightest any of its available energy or potential life. To place the battery in operation it is only necessary to strike the protuberance on the bottom of the zinc cup on any hard surface sufficiently vigorously to break the thin wall of the glass vial and allow the electrolyte to run out. The electrolyte being very thin is immediately absorbed by the liner 29, which reaches to the bottom of the cup for that purpose, and is carried up by capillary attraction and delivered to the depolarizing agent. The quantity of electrolyte is just sufficient to give this material the proper degree of moisture for efficient operation of the battery for maximum life. The action is almost instantaneous and the battery is ready for use as soon as the vial has been broken no matter in what position it is held at the time of breaking the same.

The space at the lower portion of the zinc cup, normally housing the vial, contains no liquid when the battery is in operation so that at least the bottom wall of the zinc cup is inactive as an electrode. To make up for this deficiency the sealing annulus 38 is formed of zinc to provide additional electrode area and since it bears directly on the porous liner which rests on the top of the depolarizing agent, it is active in the operation of the battery. By the same token the formation of the spider of zinc insulated by porous paper from the bobbin will provide an additional area of zinc electrode and thus provide a dual function for the spider. The zinc will also be more rigid than the other materials.

It has been found by numerous tests that a battery of this type will provide on an average about 20% more potential power at the time it is put into operation than does the conventional type of dry cell. This may be explained by the shelf loss of the conventional cell and by the fact that such cell must provide a considerable space at the top as a gas reservoir to prevent disrupting the cell when it is suddenly put on a high discharge. The cells being tightly sealed, room must be provided for the gas generated as a result of the chemical activity and an expansion chamber is therefore provided. When the cell is temporily not in operation the excess gas pressure leaks off through the pores of the carbon rod or through any minor leaks which may occur in the seal. The space originally occupied by applicant's glass vial provides the equivalent of the gas expansion chamber at the top of the usual cell without offering any manufacturing difficulties in its formation.

Furthermore in the usual type of cell the depolarizing agent does not reach to the zinc cup liner but is surrounded by a relatively thick layer of a paste-like material often containing flour, the purpose of which is to hold in a pasty form a reserve of the electrolyte which provides for the operation of the cell. This material is absent in applicant's construction and more polarizing agent can be provided with a consequent longer life and more active one. The internal resistance of the cell is lower because of the closer proximity of the polarizing agent to the zinc electrode and the battery therefore can be used in a more rundown condition than can the conventional battery with its higher internal resistance.

In Figures 5 and 6 is shown a further embodiment of the invention where the supporting disc for the bobbin is carried directly from the walls of the zinc cup rather than from the bottom of the cup through the agency of legs. The disc may be formed as shown at 50 in Figure 6 with the relieved edges formed by cutting away sectors 51 of any desired size and number. In this construction the zinc cup 25' is formed with a rolled-in bead 52 at the proper height about the bottom to provide accommodation for the electrolyte vial. The lining material is put in position and the disc 50 is assembled on top of the vial, being carried by the walls of the zinc cup and providing adequate support for the bobbin and the central electrode. Otherwise this embodiment is constructed in the same manner as the preferred one.

In the embodiment disclosed in Figure 7 the supporting spider is inverted and comprises the integral disc 55 with the upwardly extending arms 56 of greater length than the legs of the preferred embodiment. They reach substantially to the top of the zinc cup, pass along the inside of the bibulous liner 57 and may be attached to the upper portion of the cup in any desired manner as, for instance, by the non-ferrous rivets 58 passing through the liner, the cup, and the arms. This arrangement places the arms in tension rather than in compression and permits the use of a less rigid material if desired.

In another embodiment as illustrated in Figures 8 and 9, the bobbin may be said to be self-supporting for the central carbon electrode 60 is provided with a disc-like head 61 of suitable fibrous material and having a diameter to provide a loose fit within the bibulous liner 62 for the zinc cup. This disc may conveniently be assembled adjacent the lower end of the carbon by having a groove 63 formed in the carbon and a slot 64 in the disc to slide over the small diameter of the same. If desired, to prevent slumping of the depolarizing agent, the slot may be closed by a strip of cardboard or the like if necessary.

The assembly at the upper end of the cup and carbon is such as to seal and support the carbon. A rigid washer 65 is assembled on the rod 60 beneath the metal cap and this rests on the top of the zinc sealing annulus 66 as shown. This annulus is supported on the inturned bead 67 just below the upper edge of the zinc cup and the edge of the cup is then flanged over as shown. A sealing washer 68 of suitable material effects a moisture-tight joint between the carbon rod and the zinc annulus as in previous embodiments.

It will be seen that any of the above embodiments provides means to always support the central electrode in fixed relation to the cup electrode and to maintain the depolarizing mass in position about the same and against the top seal which forms an extension of the cup.

Having thus described the invention, what is claimed as new and desired to be secured by Letters Patent is:

1. In a dry cell of the type described, a cup-shaped container anode, a central cathode and depolarizer constituting a bobbin, a seal for said cup engaging said cathode and substantially contacting the top of said depolarizer, a spacer disc engaging the bottom of said depolarizer and cathode, means supporting said disc in rigid fixed spaced relation to the bottom of said cup, an electrolyte filled vial between said disc and the cup bottom and substantially engaging each to be broken upon slight deformation of said bottom, and an absorbent medium between the depolarizer and cup and extending toward the bottom of the cup so as to be in contact with the electrolyte when the vial is broken.

2. A dry cell of the type adapted for end to end mounting under spring pressure for ensuring electrical contact between its electrodes and an external circuit comprising, in combination, a cup-shaped container anode, an insulating sleeve covering the outer side walls only thereof, leaving the bottom for contact, a central cathode in said cup with its upper end extending above the edge thereof for contact, a frangible vial filled with an electrolyte solution in the bottom of said cup, an insulating member substantially engaging the top of said vial and supported against downward movement in said cup, a bibulous lining for substantially the entire inner side walls of said cup, said member supporting the said cathode, and a dry depolarizing material supported on said member and substantially filling the space above the same and between the cathode and said lining, said vial being unsupported except between the cup bottom and member, whereby it may be broken by deformation of said bottom.

3. A dry cell of the Leclanche type including, in combination, a zinc cup, a frangible vial of electrolyte resting directly on the bottom of said cup, a bobbin substantially filling the cup above the vial, a bibulous lining between said bobbin and said cup and extending substantially to the bottom of the latter, and rigid means supported to prevent the subsidence of the bobbin into the original vial-space after the same has been broken by deforming the cup bottom.

4. In a dry cell of the non-deteriorating type for flash-light use, in combination, a zinc cup, a zinc annulus substantially closing the cup top, a lining of bibulous material for the side walls of the cup and for the annulus, a bobbin substantially engaging all of said lining except a shallow band adjacent the cup bottom, said bobbin having a carbon electrode the upper end of which passes out through the opening in said annulus, a frangible vial extending from the cup bottom substantially to the lower end of said carbon, a thin liquid electrolyte in said vial, said bobbin being dry until said vial is broken by deformation of the cup, and rigid means positioned by said cup to support the bobbin material after the vial is broken and the bobbin is wetted.

5. In a dry cell of the non-deteriorating type for flash-light use, in combination, a zinc cup, a zinc annulus substantially closing the cup top, a lining of bibulous sheet material for the side walls of the cup and for the annulus, a bobbin substantially engaging all of said lining except a shallow band adjacent the cup bottom, said bobbin having a carbon electrode the upper end of which passes out through the opening in said annulus and is exposed for direct contact with the bottom of an adjoining battery cell, a frangible vial extending from direct engagement with the cup bottom substantially to the lower end of said carbon, a thin liquid electrolyte in said vial, and rigid means separating the bobbin and vial and directly supporting the bobbin, said means being fixed in position by said cup.

6. In a dry cell of the non-deteriorating type, in combination, a zinc cup, a lining of bibulous material for substantially the entire side walls of said cup, a bobbin comprising a carbon rod and a dry depolarizing mass substantially filling all but the lower portion of said cup, a frangible vial extending substantially between the cup bottom and said bobbin, a thin liquid in said vial adapted to be released by the breaking thereof, and rigid means engaging the whole bottom of the bobbin and supported to prevent said bobbin from moving into the space vacated by the breaking of the vial.

7. In a dry cell of the non-deteriorating type, in combination, a zinc cup, a lining of porous insulating material extending substantially over the entire inner side walls thereof, a frangible sealed vial in the bottom of said cup, a liquid electrolyte in said vial, a central carbon rod sealed to the upper edge of the cup and extending substantially to the vial, a mass of dry depolarizing material substantially filling the space in said cup above the bottom of said rod, and rigid means always engaging the rod to hold the same in its position elevated above the cup bottom when the vial is broken to release the liquid, said means being the sole separation between the rod and the vial.

8. In a non-deteriorating dry cell, in combination, an imperforate zinc cup, a lining of bibulous material extending substantially over the entire inner side wall of said cup, a dry bobbin containing a carbon rod substantially filling the upper portion of said cup, a permanent gas-tight seal fitting closely against said bobbin and against the projecting upper end of said rod, a frangible vial beneath said bobbin, a thin liquid electrolyte in said vial of only sufficient quantity to be all absorbed in the bobbin when the vial is broken, and means to keep the space originally occupied by the vial clear to act as a gas expansion reservoir.

9. In a dry cell of the type described, in combination, a cup-shaped zinc electrode, a lining for the side walls thereof formed of bibulous material, a frangible vial resting on the cup bottom, an insulating washer of substantially the inner diameter as the cup and having integral legs of a length equal to the height of said vial, said washer being positioned over said vial with the legs engaging the cup bottom, a dry bobbin resting on said washer and substantially filling the cup above the same, said liner being formed over the top of the bobbin, the central carbon rod of the bobbin extending above the cup edges, a zinc annulus resting on said covering liner, being engaged by the cup edges and reaching nearly to said rod extension, a seal between the rod and annulus and such a quantity of liquid electrolyte in said vial that it can all be absorbed by said liner and bobbin when the vial is broken by deforming the cup bottom.

10. In a dry cell of the non-deteriorating type having all parts substantially relatively immovable, a zinc cup, a lining of bibulous material extending substantially over the entire inner side wall of said cup, a bobbin within said lining, electrode means supporting said bobbin from the cup and spaced from the bottom thereof, and a frangible vial of electrolyte closely fitting between the cup bottom and the said means engaging both.

11. In a dry cell of the non-deteriorating type for flash-light use, in combination, a zinc cup, a zinc annulus substantially closing the cup top, a lining of bibulous material for substantially the entire side walls of the cup and for the annulus, a bobbin substantially engaging all of said material except a shallow band adjacent the cup bottom, said bobbin having a carbon electrode the upper end of which passes out through the opening in said annulus, a frangible vial extending from the cup bottom substantially to the lower end of said carbon, a thin liquid electrolyte in said vial, said bobbin being dry until said vial is broken by deformation of the cup, and means constituting an extension of the zinc area to prevent the bobbin material from sagging into the space vacated by the vial when broken.

GUNNAR A. F. WINCKLER.